US006859923B2

(12) United States Patent
Taylor

(10) Patent No.: US 6,859,923 B2
(45) Date of Patent: Feb. 22, 2005

(54) METHOD, SYSTEM, PROGRAM, AND DATA STRUCTURES FOR USING A DATABASE TO APPLY PATCHES TO A COMPUTER SYSTEM

(75) Inventor: Julian S. Taylor, Nederland, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 611 days.

(21) Appl. No.: 09/852,113

(22) Filed: May 9, 2001

(65) Prior Publication Data

US 2004/0015938 A1 Jan. 22, 2004

(51) Int. Cl.[7] .............................................. G06F 9/45
(52) U.S. Cl. ....................................................... 717/172
(58) Field of Search ................................. 717/172, 168, 717/174

(56) References Cited

U.S. PATENT DOCUMENTS

| | | | | |
|---|---|---|---|---|
| 6,438,749 | B1 | * | 8/2002 | Chamberlain ................ 717/174 |
| 2002/0112230 | A1 | * | 8/2002 | Scott ........................... 717/169 |
| 2002/0116665 | A1 | * | 8/2002 | Pickover et al. .............. 714/38 |
| 2002/0174422 | A1 | * | 11/2002 | Kelley et al. ................ 717/178 |
| 2004/0003266 | A1 | * | 1/2004 | Moshir et al. ............... 713/191 |
| 2004/0015938 | A1 | * | 1/2004 | Taylor ......................... 717/168 |
| 2004/0015949 | A1 | * | 1/2004 | Taylor ......................... 717/171 |

OTHER PUBLICATIONS

U.S. Appl. No. 09/851,923, filed May 9, 2001, entitled, "Method, System, Program, And Data Structures For Applying A Patch To A Computer System", invented by J.S. Taylor.

U.S. Appl. No. 09/852,070, filed May 9, 2001, entitled, Method, System, And Program for Providing Patch Expressions Used In Determining Whether To Install A Patch, invented by D.K. Hiltgen and J.S. Taylor.

Indigo Rose Software Design Corp. "HOWTO: Detect a Previous Install Location and Use it as a Default Path for a New Install" from *Setup Factory 5.0* [online], Article ID: IRKB–SF5–000002, Nov. 9, 1999, pp. 1–5, [Retrieved on May 3, 2001]. Retrieved from the Internet at URL: <http://www.indigorose.com>.

Indigo Rose Software Design Corp. "Setup Factory 5.0 *User's Guide*" [online], Oct. 1999, pp. 1–67. [Retrieved on May 3, 2001]. Retrieved from the Internet at URL: <http://www.indigorose.com>.

* cited by examiner

*Primary Examiner*—John Chavis
(74) *Attorney, Agent, or Firm*—Lahive & Cockfield, LLP

(57) ABSTRACT

Provided is a method, system, program, and data structure for determining patches to apply to a computer system, wherein the patch includes content to add to the computer. A realization list of realization identifiers corresponds to realizations associated with the computer, wherein each realization defines a state of the computer. A realization database includes realization objects, wherein each realization object is uniquely identified by a realization identifier of one realization and includes a patch list indicating those patches whose installation relates to the computer state defined by the realization. The patch lists are accessed from the realization database for those realization objects whose realization identifiers match the realizations identifiers on the realization list. A determination is made of all the patches on the accessed patch lists. A determination is made from the determined patches on the accessed patch lists those patches that are capable of being installed on the computer.

52 Claims, 14 Drawing Sheets

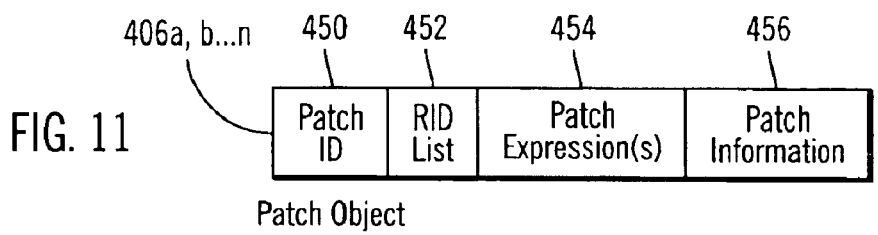
FIG. 11  Patch Object
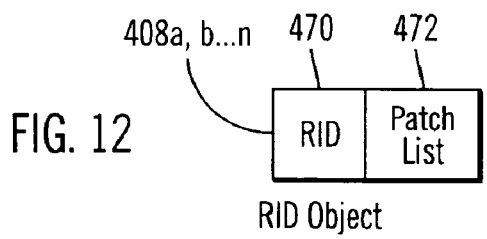
FIG. 12  RID Object
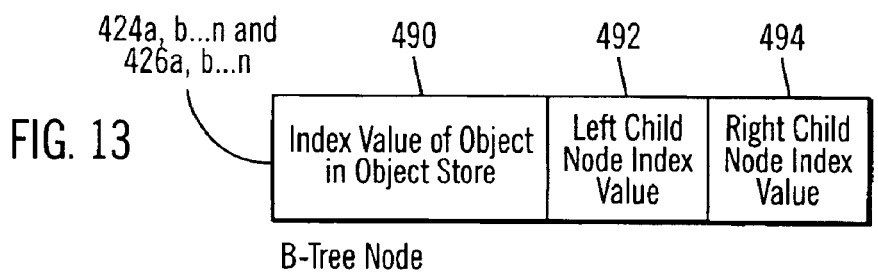
FIG. 13  B-Tree Node

METHOD, SYSTEM, PROGRAM, AND DATA STRUCTURES FOR USING A DATABASE TO APPLY PATCHES TO A COMPUTER SYSTEM

CROSS REFERENCE TO RELATED APPLICATIONS

This patent application is related to the following co-pending and commonly assigned patent applications filed on the same date herewith, and which are incorporated herein by reference in their entirety:

"Method, System, Program, and Data Structures For Applying a Patch to a Computer System", Ser. No. 09/851,923; and "Method, System, and Program for Providing Patch Expressions Used in Determining Whether to Install a Patch", Ser. No. 09/852,070.

BACKGROUND OF THE INVENTION

1. Field of the Invention

The present invention relates to a method, system, program, and data structure for using a database to apply patches to a computer system.

2. Description of the Related Art

In the prior art, to update or upgrade installed programs, a computer user would typically electronically access a vendor server site over a network, such as the Internet, and download the needed programs. Certain software vendors, such as Microsoft Corporation, provide an update program downloaded from Microsoft's web site that runs locally on the user computer, determines installed components, and presents updates the user may select to apply without transmitting any system information to Microsoft. The computer user may select suggested updates to download from the Microsoft web site. Such prior art techniques for locally analyzing the system and determining upgrades to apply are limited in that they perform only basic checking of installed components and require the execution of a program that interrogates system files each time updates are requested.

Moreover, prior art installation and updating programs, such as the Microsoft online update program and the Setup Factory installation program utilize commands and code that execute in the general operating system environment and are capable of accessing general system resources. Such an open architecture for applying updates and installations raises security concerns because the software vendor providing the update may inadvertently or malevolently access or modify system configuration information, data, and restricted data. Such security concerns are further heightened for update and installation packages provided by software vendors that are not known and trusted entities.

Software vendors also make updates and fixes available through their web sites. The user typically accesses the software vendor's web site and then will attempt to ascertain what fixes and updates are needed by reading documentation on the web site. In such cases, the application of updates is based on the specific knowledge of the user of the host computer, which in many cases may be inadequate to correctly determine and select the appropriate updates and fixes to apply given the current system status.

For these reasons, there is a need in the art to provide improved techniques for determining system configuration information and applying program fixes and updates to the system.

SUMMARY OF THE PREFERRED EMBODIMENTS

Provided is a method, system, program, and data structure for determining patches to apply to a computer system, wherein the patch includes content to add to the computer. A realization list of realization identifiers corresponds to realizations associated with the computer, wherein each realization defines a state of the computer. A realization database includes realization objects, wherein each realization object is uniquely identified by a realization identifier of one realization and includes a patch list indicating those patches whose installation relates to the computer state defined by the realization. The patch lists are accessed from the realization database for those realization objects whose realization identifiers match the realizations identifiers on the realization list A determination is made of all the patches on the accessed patch lists. A determination is made from the determined patches on the accessed patch lists those patches that are capable of being installed on the computer.

The patch content to add to the computer may comprise a new program, an upgrade to an installed program, a fix to an installed program, documentation, etc.

In further implementations, information is presented on an output device of those determined patches capable of being installed on the computer. User selection is received of one or more patches to add to the computer that are indicated in the presented information.

Further provided is a method, system, program and data structure for determining patches to apply to a computer system, wherein the patch includes content to add to the computer. A computer object is generated including configuration information on components in the computer and a realization list of realization identifiers corresponding to realizations associated with the computer, wherein each realization defines a state of the computer. A realization database of realization objects is downloaded from a patch server, wherein each realization object is uniquely identified by a realization identifier of one realization and includes a patch list indicating those patches whose installation relates to the computer state defined by the realization. Patch lists are accessed from the realization database from those realization objects whose realization identifiers match the realizations identifiers on the realization list. A determination is made of all the patches on the accessed patch lists. A further determination is made from the determined patches on the accessed patch lists of those patches that are capable of being installed on the computer.

BRIEF DESCRIPTION OF THE DRAWINGS

Referring now to the drawings in which like reference numbers represents corresponding parts throughout:

FIG. 11 illustrates fields in a patch object in accordance with implementations of the invention;

FIG. 12 illustrates fields in a realization object in accordance with implementations of the invention;

FIG. 13 illustrates a node entry in accordance with certain described implementations of the invention;

DETAILED DESCRIPTION OF THE DESCRIBED IMPLEMENTATIONS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
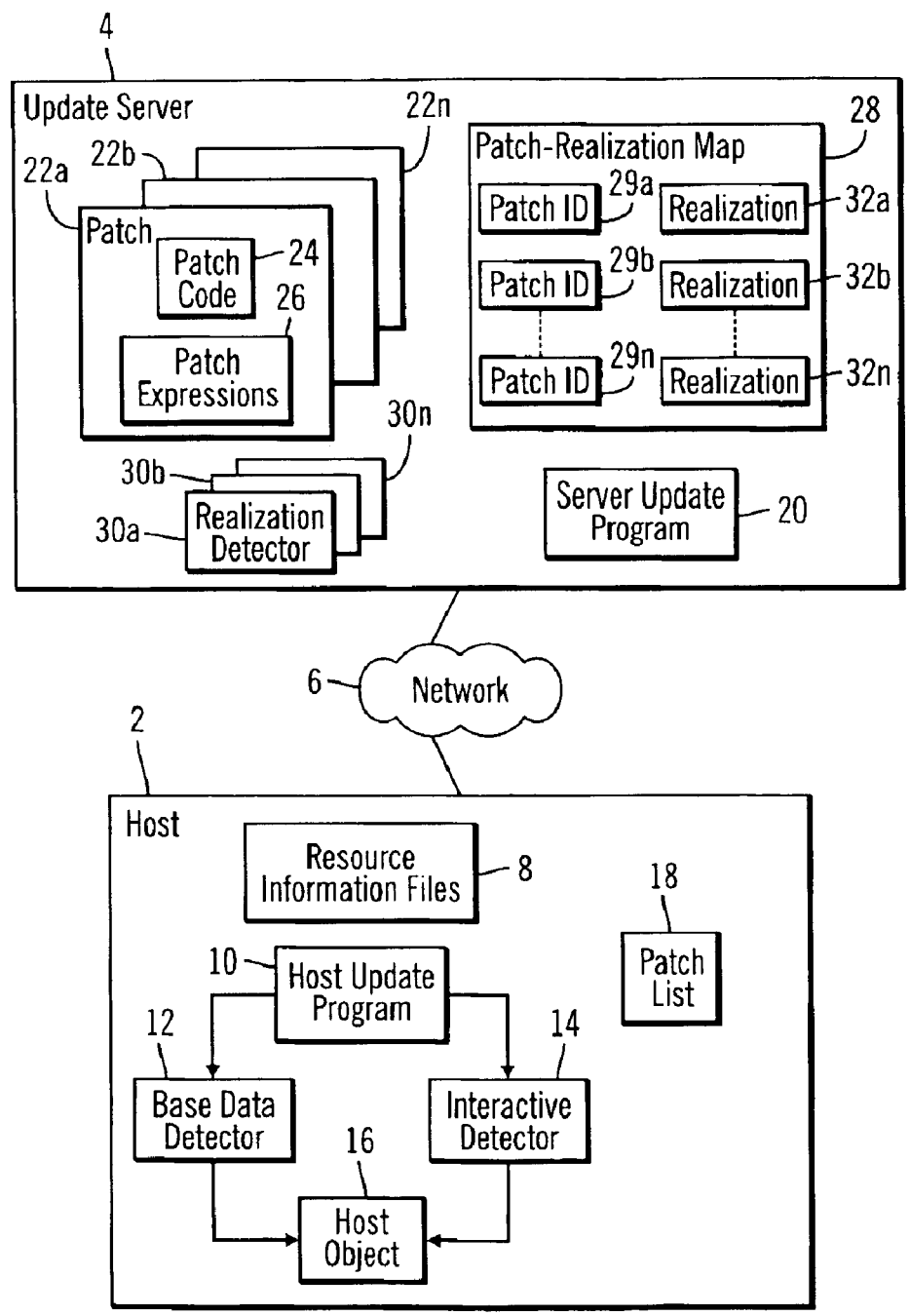
FIG. 1 illustrates a computer architecture in which aspects of the invention are implemented.

FIG. 1 illustrates a network computing environment in which aspects of the invention are implemented. A host computer 2 and server computer 4 communicate over a network 6, such as a Local Area Network (LAN), Wide Area Network (WAN), the Internet, an Intranet, etc., using any network protocol known in the art, e.g., Ethernet, Fibre Channel, TCP/IP, HyperText Transfer Protocol (HTTP), File Transfer Protocol (TP), etc. The host 2 includes one or more resource information files 8 that provide tables, databases or other data structures providing information on installed system hardware and software resources, such as registry files or any other files. The host 2 further includes a host update program 10 that includes program code and modules to handle the update related operations in the host 2, including the base data detector 12 and interactive detector 14 that interrogate and determine host configuration information to use when generating a host object 16 that provides information on installed software packages, applied patches, firmware revisions, and any other software and/or hardware resource configuration on the host 2.

The server 4 includes a server update program 20 that handles requests for updates from the host 2 and a plurality of patches 22a, b . . . n. Each patch 22a, b . . . n includes patch code 24, which comprises the update or program fix to add to software or firmware installed on the host 2 or on a device attached to the host, e.g., a disk drive, tape drive, etc. An upgrade is an installation that changes the version number of the product, which often involves adding functionality to the program. A fix (also known as an update) comprises one or more software modules to add to an installed software program that does not add or remove any functionality, but merely fixes a known problem or bug. Additionally, the patch 22a, b . . . n may provide any other types of content to add to the host 2, such as new program installations or documentation. Each patch 22a, b . . . n also includes one or more patch expressions 26 of script commands executed by the host update program 10 to evaluate certain conditions in the host object 16 and determine whether or in what manner the patch code 24 for the patch 22a, b . . . n is capable of being applied to the host 2 given the information on the host configuration maintained in the host object 16. Further details of the structure of the patch expressions 26 are described in the related application entitled "Method, System, and Program for Providing Patch Expressions Used in Determining Whether to Install a Patch", having attorney docket no. P6281, and which was incorporated herein by reference above.

The update server 4 further includes a patch-realization map 28 indicating how realizations are associated with the patches 22a, b . . . n. The map 28 provides an association of unique patch identifiers (IDs) 29a, b . . . n of the patches 22a, b . . . n and realizations 32a, b . . . n, which may have a many-to-may relationship. The map 28 may be implemented as a table of associations or as one or more database tables. A realization 32a, b . . . n, described below, is a data structure indicating a particular host state. For instance, if the patch 22a, b . . . n is used to fix a known bug, then the realizations 32a, b . . . n associated with that patch 22a, b . . . n in the patch-realization map 28 would indicate the state corrected by the patch 22a, b . . . n. The update server 4 also includes one or more realization detectors 30a, b . . . n that are downloaded to the host 2 to write realizations 30a, b . . . n to the host object 16

Figure 2:
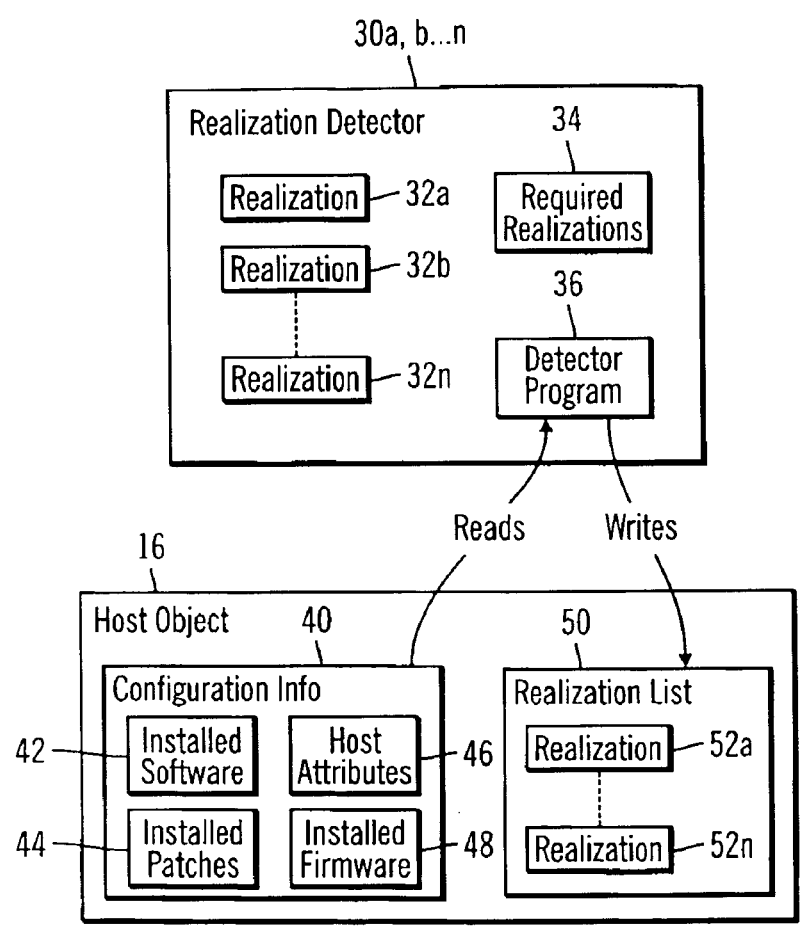
FIG. 2 illustrates components within a realization detector and the host object, and their interaction, in accordance with certain implementations of the invention.

FIG. 2 illustrates how the realization detectors 30a, b . . . n interact with the host object 16. The realization detectors 30a, b . . . n are capable of identifying one or more realizations 32a, b . . . n that are associated with one or more of the patches 22a, b . . . n according to the patch-realization map 28. The realizations 32a, b . . . n comprise registered well-defined versioned strings, each of which identifies a specific state of the host system 2, such as the presence of one or more hardware and/or software resource. Thus, a realization 32a, b . . . n is associated with a particular state of the host 2. The realization detectors 30a, b . . . n further include a required realization variable 34 indicating the realization name and version number of base realizations in other realization detectors 30a, b . . . n that must be verified in the host object 16 in order for the dependent realization detector 32a, b . . . n to complete. Thus, a dependent realization 32a, b . . . n requires the presence of one or more base realizations in the host object 16, placed there by the execution of a previous realization detector 30a, b . . . n. Moreover, the realizations 32a, b . . . n within one realization detector 30a, b . . . n may be organized in an order such that any realizations dependent on a base realization 32a, b . . . n within the same realization detector 30a, b . . . n are processed after the base realizations from which they depend. Still further, the realization detectors 30a, b . . . n may be organized so that those detectors 30a, b . . . n including base realizations 32a, b . . . n are processed before realization detectors 30a, b . . . n including realizations 32a, b . . . n dependent therefrom. The realization detectors 30a, b . . . n include a detector program 36 that executes on the host 2 and analyzes information in the host object 16 to determine whether the state associated with the realizations 32a, b . . . n exists on the host 2.

FIG.2 illustrates that the host object 16 includes configuration information 40, written by the base data detector 12 and/or interactive detector 14, such as information on installed software 42, installed patches 44, host attributes 46 (e.g., host 2 architecture, operating system, manufacturer, directly attached devices, etc.), and installed firmware 48. The detector program 36 reads the configuration information 40 and based thereon writes any number or no realizations 32a, b . . . n associated with the realization detector 30a, b . . . n to the host object 16. The host object 16 further includes a host realization list 50 of realization entries 52a, b . . . n written by the detector program 36, indicating realization states detected on the host 2. When determining whether the state associated with a realization 32a, b . . . n exists in the host 2, the detector program 36 may consider configuration information 40 and/or realizations 32a, b . . . n previously written to the host object 16 realization list 50

Figure 3:
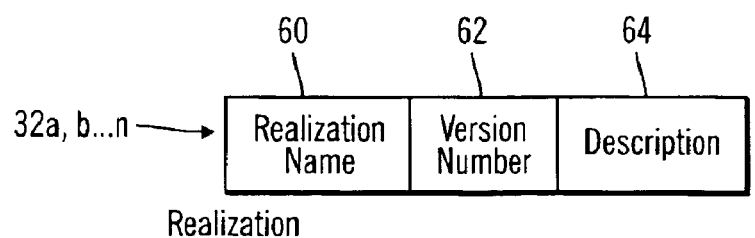
FIG. 3 illustrates a data structure of a realization in accordance with certain implementations of the invention.

FIG. 3 illustrates the fields in the realizations 32a, b . . . n maintained in the patch-realization map 28, which associates patch IDs 29a, b . . . n with realizations 32a, b . . . n. The realizations 32a, b . . . n in the patch-realization map 28 include:

Realization name 60: comprises a unique identifier for a particular realization 30a, b . . . n.

Version number 62: indicates a version of a particular realization. As new versions of realizations are released, the version number is incremented indicating the number of version changes.

Description 64: provides a brief free format description of the realization or state being checked, e.g., a couple of hundred ASCII characters.

Figure 4:
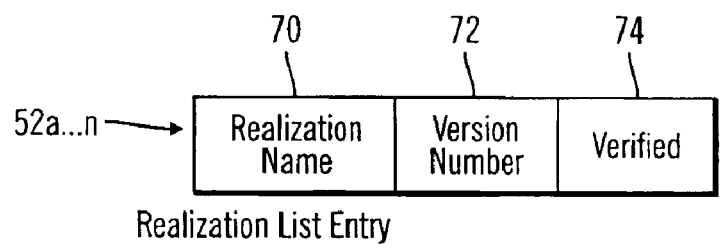
FIG. 4 illustrates a data structure of an entry in a realization list in the host object in accordance with certain implementations of the invention.

FIG. 4 illustrates the format of realization entries 52a, b . . . n in the host realization list 50 in the host object 16 written by the detector programs 36, including the realization name 70 and version number 72, which would be the realization name 60 and version number 62 maintained in the realizations 32a, b . . . n in the patch-realization map 28. A realization list entry 52a, b . . . n further includes a verified flag 74 indicating whether the detector program 36 returned true for the checked realization, i.e., the state checked by the detector program 36 exists in the host object 16, or false, i.e., the state does not exist in the host 2 according to information in the host object 16.

The detector program 36 may include one or more of the following methods that query the host object 16 for information on the availability of particular configuration information 40 and realizations:

is Operating System: returns true if the target host 2 operating system as indicated in the host object 16 is the same as the specified operating system (OS), else returns false.

is OS Release: returns true if the target host 2 operating system as indicated in the host object 16 is of the specified release, else returns false.

is Platform: returns true if the target host 2 hardware platform as indicated in the host object 16 is the same as the specified platform, else returns false.

is Architecture: returns true if the target host 2 processor architecture as indicated in the host object 16 is the same as the specified processor architecture, else returns false.

verify Realization: verifies that the verified flag 56 (FIG. 5) in a realization entry 60 in the realization list 52 is true, i.e, the state checked by the realization exists on the host 2.

has Exact Realization: returns true if the target host object 16 has a realization 30a, b . . . n in the realization 52 list having same realization name 50 and same version number 42 as specified realization.

has Realization: returns true if the target host object 16 has a realization 30a, b . . . n in the realization 52 list having same realization name 50 and same or newer version number 42 as specified realization.

has Exact Software Package: returns true if the target host object 16 has an installed software package having the same name and version number as specified software package.

has Softwar ePackage: returns true if the target host object 16 has an installed software package having the same name and a same or newer version number as specified software package.

has Exact Patch ID: returns true if the target host object 16 has an installed patch having the same name and a same version number as specified patch ID.

has Patch ID: returns true if the target host object 16 has an installed patch having the same name and a same or newer version number as specified patch ID.

The detector program 36 may include combinations of one or more of the above methods to determine a state of the host 2 with respect to installed hardware and software components from the configuration information 40 and realization entries 52a, b . . . n included in the host realization list 52. The state determined by the detector program 36 may indicate whether an update is not likely to operate on the host 2 system. Additionally, when the patch code 24 comprises a fix, such as code to eliminate a bug, the state determined by the detector program 36 may indicate whether the configuration of the host 2 is particularly susceptible to the bug the patch code 24 is intended to fix.

Figure 5:
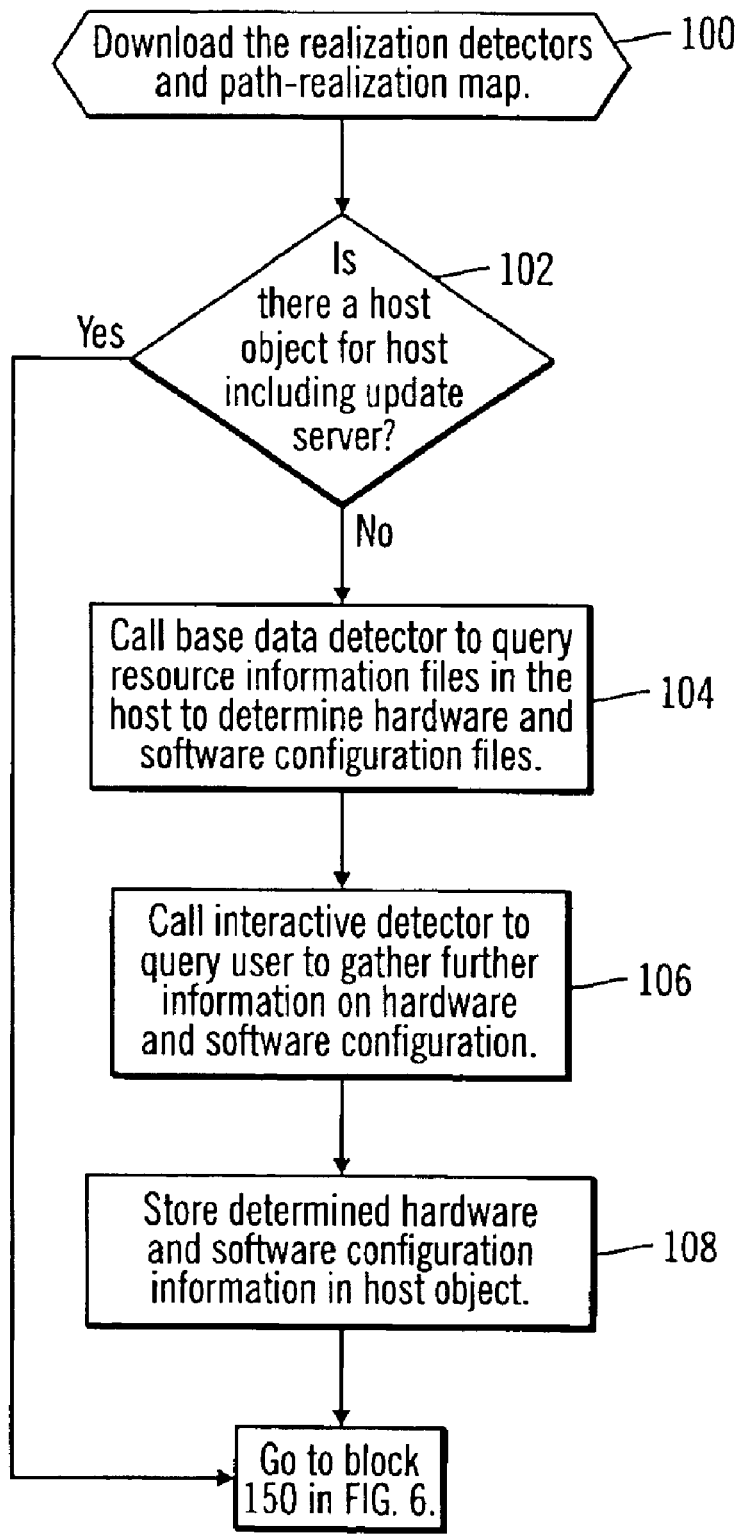
FIGS. 5, 6, 7a, 7b, and 8 illustrate logic to apply code from patches to a host system in accordance with certain implementations of the invention.

FIG. 5 illustrates logic executed in the host update program 10 to construct a host object 16 that defines the hardware and software configuration of the host 2. Control begins at block 100 with the host update program 10 downloading the patch-realization map 28 identifying patches 22a, b . . . n and one or more associated realizations 32a, b . . . n and the realization detectors 30a, b . . . n. If (at block 102) there already exists a host object 16 for the host 2, then control proceeds to block 150 in FIG. 6; otherwise, the host update program 10 calls (at block 104) the base data detector 12 to query the resource information files 8 to determine the software and hardware configuration existing on the host 2. The host update program 10 may further call (at block 104) the interactive detector 14 to present the user with questions regarding otherwise undetectable software and hardware configurations. Through this user interface the user may select to specify the configuration of the host 2. For instance, the user interface may display check boxes and/or drop down menus of different hardware and software configuration components which the user may select to define the hardware and software configuration of the host 2 system. The determined or entered software and hardware configuration information is then stored in the host object 16 with the configuration information 40. In certain embodiments, the host update program 10 may only call the base data detector 12 to initialize the host object 16. Alternatively, the host update program 10 may only call the interactive detector 14 to initialize the host object 16 with hardware and/or software configuration information entered by the user through a user interface. Still further, both the base data detector 12 and interactive detector 14 may be called to both provide hardware and software configuration information to the host object 16.

Figure 6:
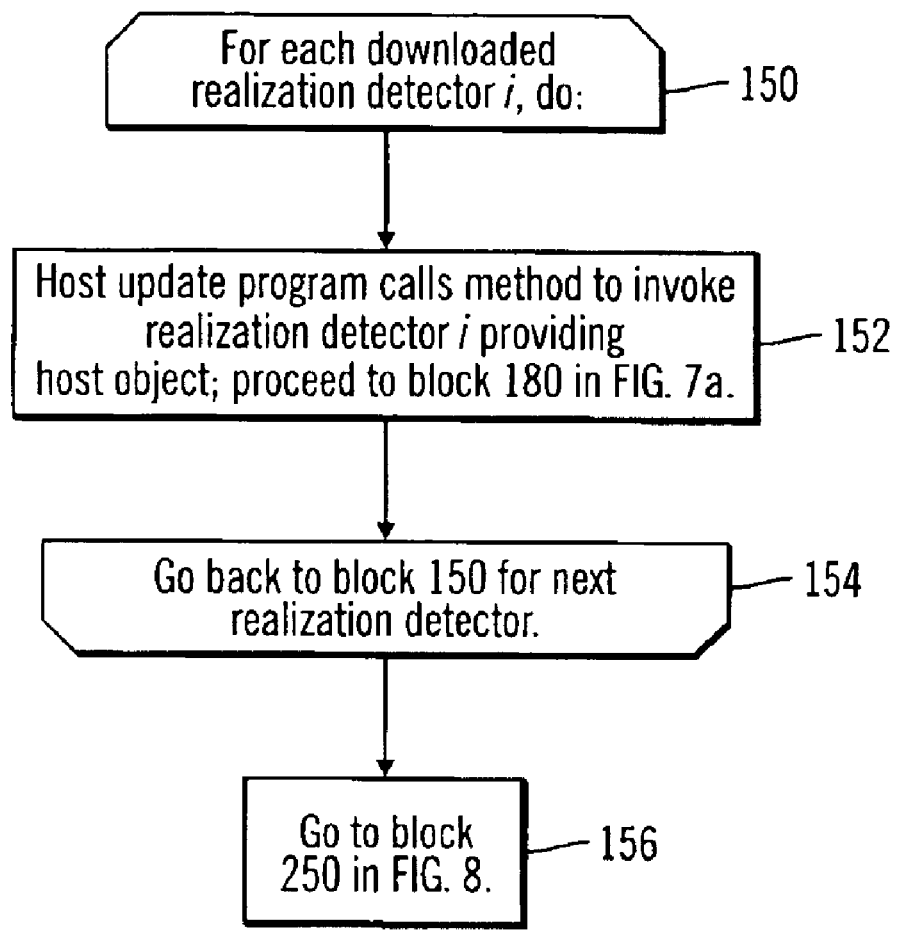
Figure 7A:
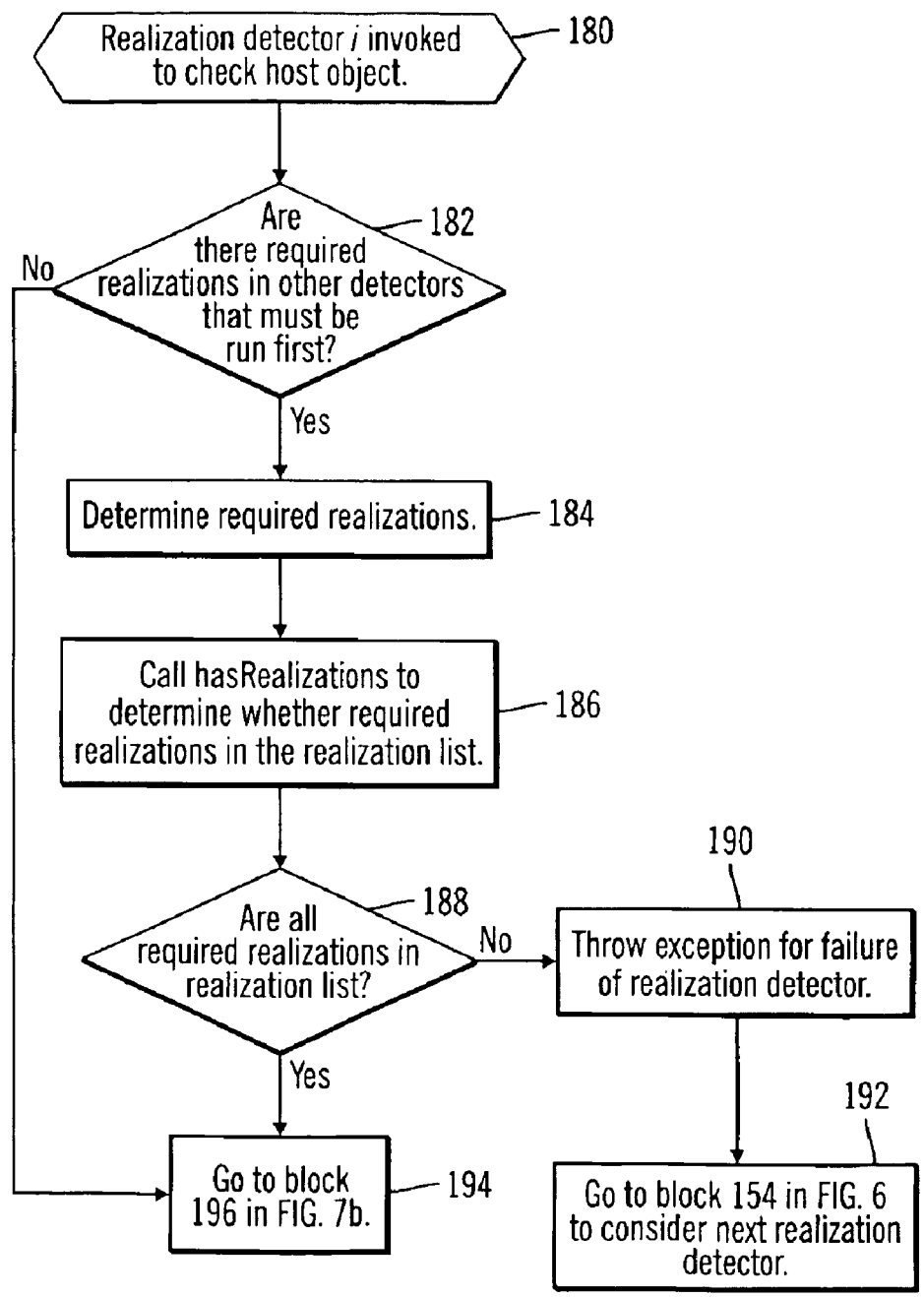
Figure 8:
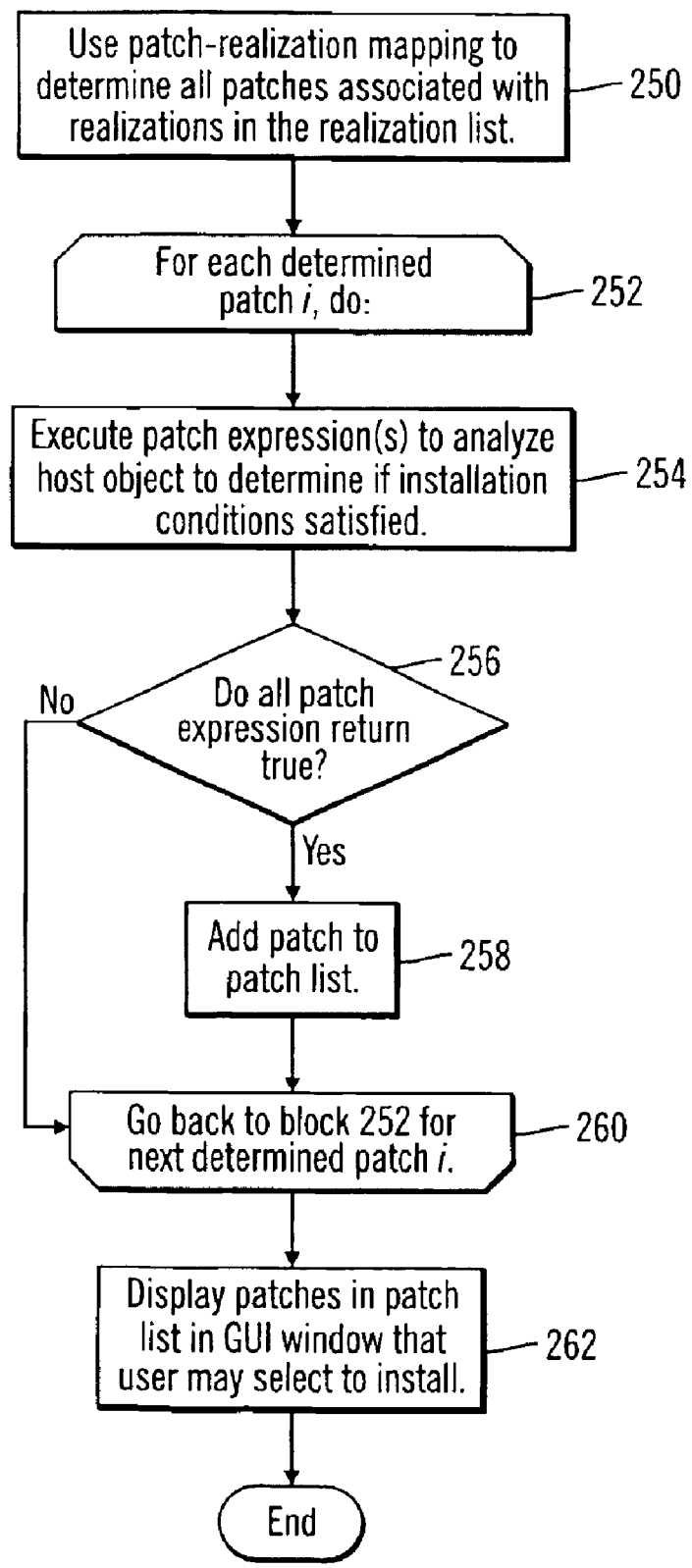

FIGS. 6 and 8 illustrate logic implemented in the host update program 10 to call the realization detectors 30a, b . . . n to determine patches that can be applied to the host 2. Once the host object 16 is initialized with configuration information from the base data detector 12 and/or interactive detector 14, control proceeds to block 150 in FIG. 6 where the host update program 10 performs a loop at blocks 150 to 154 for each downloaded realization detector i. At block 152, the host update program 10 calls a method to invoke the realization detector i providing the host object 16. Control then proceeds to block 180 in FIG. 7a.

Figure 7B:
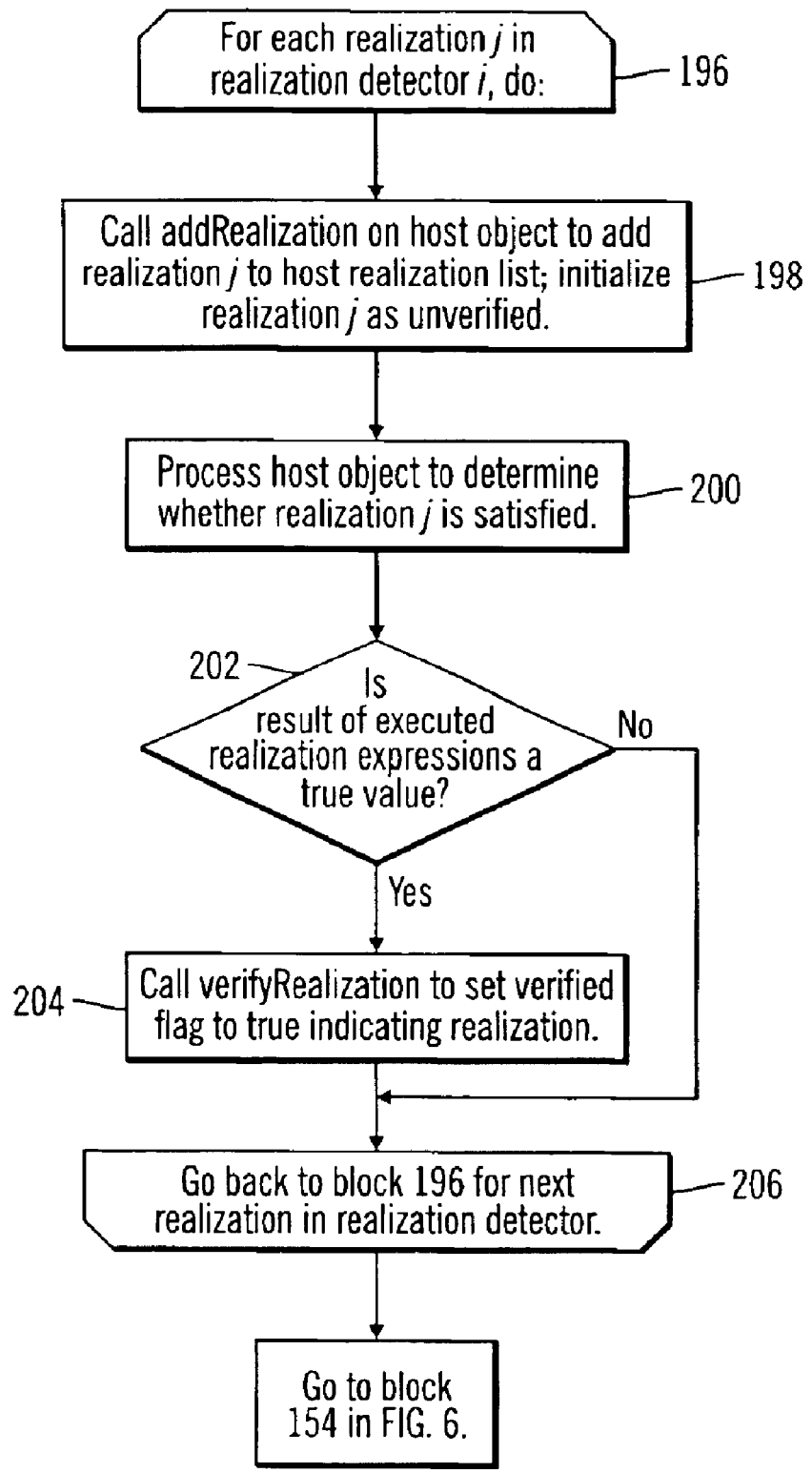

FIGS. 7a, b illustrate logic implemented in the detector program 36 to verify the presence of states defined by realizations 32a, b . . . n associated with the realization detector i. At block 180 in FIG. 7a, the realization detector i is invoked by the host update program 10 to perform blocks 182 through 206 to execute the one or more realizations 30a, b . . . n within the realization detector i. The detector program 36 calls a method, hasRealizations, to determine (at block 182) whether there are any required realizations 34 (FIG. 2) that must be included in the host realization list 50 by other realization detectors 30a, b . . . n in order for the realization detector i to determine its own realizations 32a, b . . . n. If there are required realization 34, then the detector program determines (at block 184) the required realizations and calls (at block 186) the method hasRealizations to determine whether the required realizations are in the realization list 50 of the host object 2. If (at block 188) all the required realizations 52a, b . . . n are in the host realization list 50 or if there are no required realizations, then control proceeds (at block 194) to block 196 in FIG. 7b where the detector program 36 performs a loop of steps 198 to 204 for each realization j checked by the realization detector i to register the realizations 32a, b . . . n with the host object 16.

At block 198, the detector program 36 calls the addRealization on the host object 16 to add realization j to the host object 16 and initialize the realization j as unverified, i.e., sets the verified flag 74 (FIG. 4) to false. The detector program 36 then processes (at block 200) the host object 16 to determine whether the realization j is satisfied, i.e., the state defined by the realization j exists in the host 2. The detector program 36 may determine whether certain hardware and/or software components are installed as indicated in the configuration information 40 (FIG. 2) and/or consider status of realizations 52a, b . . . n already registered in the realization list 50. If (at block 202) the result of the realization j is verified, then the detector program 36 calls (at block 204) the verifyRealization method to set the verified flag 74 for the realization j in the realization list 50 to true; otherwise, the verified flag 74 remains false. From block 202 or 204, control proceeds (at block 206) back to block 296 to consider the next realization 32a, b . . . n in the realization detector i until all realizations are processed. After all realizations 32a, b . . . n for the realization detector i are considered, control proceeds (at block 208) to back to block 154 in FIG. 6 to process the next downloaded realization detector 30a, b . . . n.

If (at block 188) the realization list 50 did not include all required realizations, then the detector program 36 would throw (at block 190) an exception indicating a failure of the realization detector i. From block 190 or 204, control proceeds (at block 192) back to block 154 in FIG. 6 to consider the next downloaded realization detector i. After processing (at block 154) all the downloaded realization detectors 30a, b . . . n, control proceeds (at block 156 in FIG. 6) to block 250 in FIG. 8.

FIG. 8 illustrates logic implemented in the host update program 10 to generate a patch list 18 which comprises the patches to present to the user for selection to install on the host 2. At block 250, the host update program 10 uses the patch realization mapping 28 to determine all patch IDs 29a, b . . . n associated with realizations 32a, b . . . n written to the host realization list 50 after processing the downloaded realization detectors 30a, b . . . n. A loop is performed at block 252 to 262. At block 254, the host update program 10 executes the patch expression(s) 26 to analyze the host object 16 to determine whether the host 2 includes specified software and/or hardware components and/or whether specific realizations 52a, b . . . n in the realization list 50 have been verified. If (at block 254) the patch expression 28 returns true, then the host update program 10 adds (at block 256) the patch i to the patch list. From block 258 or the no branch of block 256, if the patch expression returns false, i.e., the patch expression 28 conditions are not satisfied, control proceeds (at block 260) back to block 252 to consider the next downloaded patch 22a, b . . . n.

After all patches have been considered, the host update program 10 displays a user interface listing all the patches in the patch list to allow the user to select one or more patches 22a, b . . . n from the patch list to install by executing the patch code 24 for such selected patches 22a, b . . . n. The host update program 10 may download the patch code 24 for the patches 22a, b . . . n selected from the patch list 18 to conserve network bandwidth because only the patch code for user selected patches 22a, b . . . n are downloaded and installed.

The architecture described herein allows software vendors who provide patches for their installed products to make patches available on an update server 4. The described implementations provide a technique where the patch itself is able to determine whether the patch installation is compatible with the host 2 configuration. The realization detectors 30a, b . . . n are able to verify the capabilities of the host 2 indirectly through a host object 16. In certain described implementations, the only modification the detector programs 36 included with the realization detector 30a, b . . . n may make is to write verification information to the realization list 52 in the host object 16. These restrictions on the access provided to the realization detectors 30a, b . . . n protects the host system 2 from the realization detector 30a, b . . . n inadvertently or malevolently performing h operations on the host system 2.

In the above described implementations, the realization detectors 30a, b . . . n are downloaded and executed on the host 2 on which the patches 22a, b . . . n will be applied. The host update program 10 may comprise a program the host 2 temporarily downloads, such as a Java Applet**, to generate the host object 16 and determine patches 22a, b . . . n that may be applied. Additionally, the host update program 10 may comprise a stand alone program permanently installed on the host 2 that periodically checks the update server 4 for new patches 22a, b . . . n to present to the user to enable the host 2 user to apply the new patches 22a, b . . . n.

Figure 9:
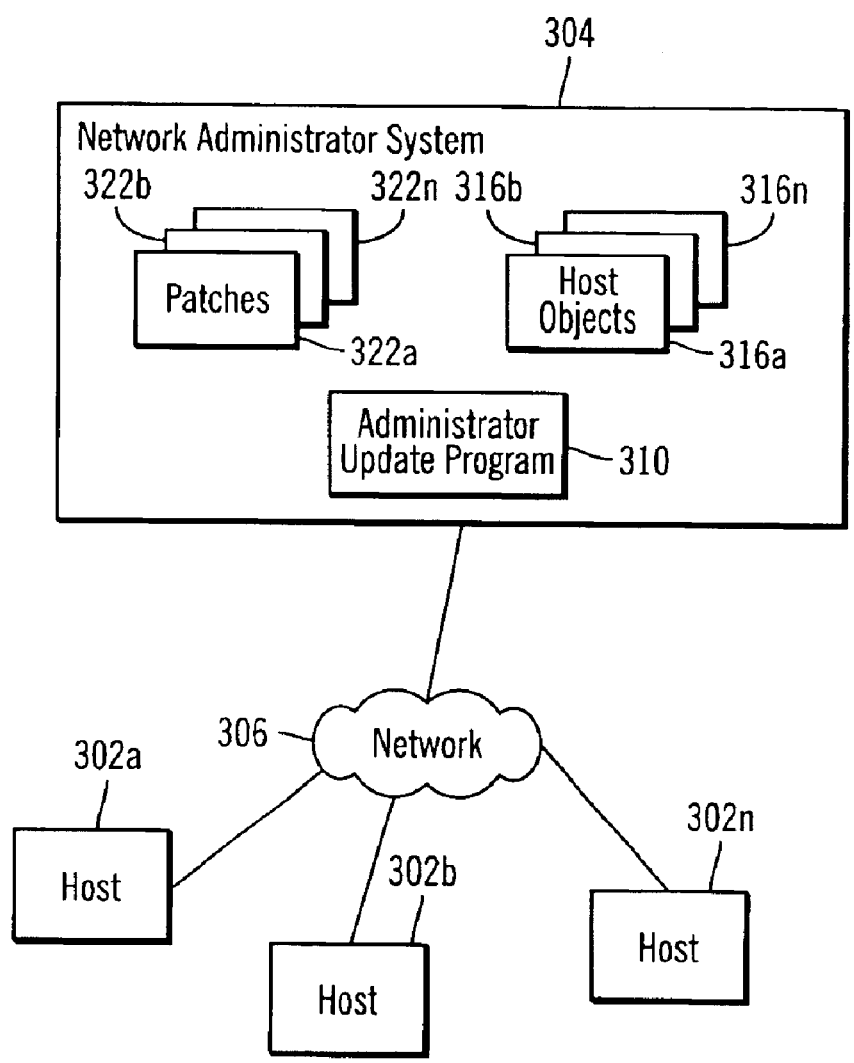
FIG. 9 illustrates a network computer architecture in which aspects of the invention are implemented.

FIG. 9 illustrates an additional implementation in which multiple hosts 302a, b . . . n are managed by a network administrator system 304. In such implementations, the network administrator system 304 would maintain host objects 316a, b . . . n for each host 302a, b . . . n, respectively, managed by the network administrator 304 over the network 306. The network administrator 304 may have initialized the host objects 316a, b . . . n using the base data detector 12 which runs locally on the hosts 302a, b . . . n and/or the interactive detector 14. With respect to the interactive detector 14, the network administrator may use the interactive detector 14 to specify the configuration of the hosts 302a, b . . . n in the network 306.

The network administrator may run an administrator update program 310 to download or otherwise access patches 322a, b . . . n and their realization detectors, and then run the detector programs in the downloaded realization detectors to determine the patches that may be applied to the hosts 302a, b . . . n on the network 306. The network administrator, using the network update program 310, may then select which compatible patches to apply to the hosts 302a, b . . . n in the network. Additionally, the network administrator may maintain all hosts 302a, b . . . n with the same configuration. In such case, network administrator selection of patches to apply may cause the network update program 310 to apply the selected patches to all the hosts 302a, b . . . n in the network 302 represented by a host object 316a, b . . . n in the network administrator system 304.

Figure 10:
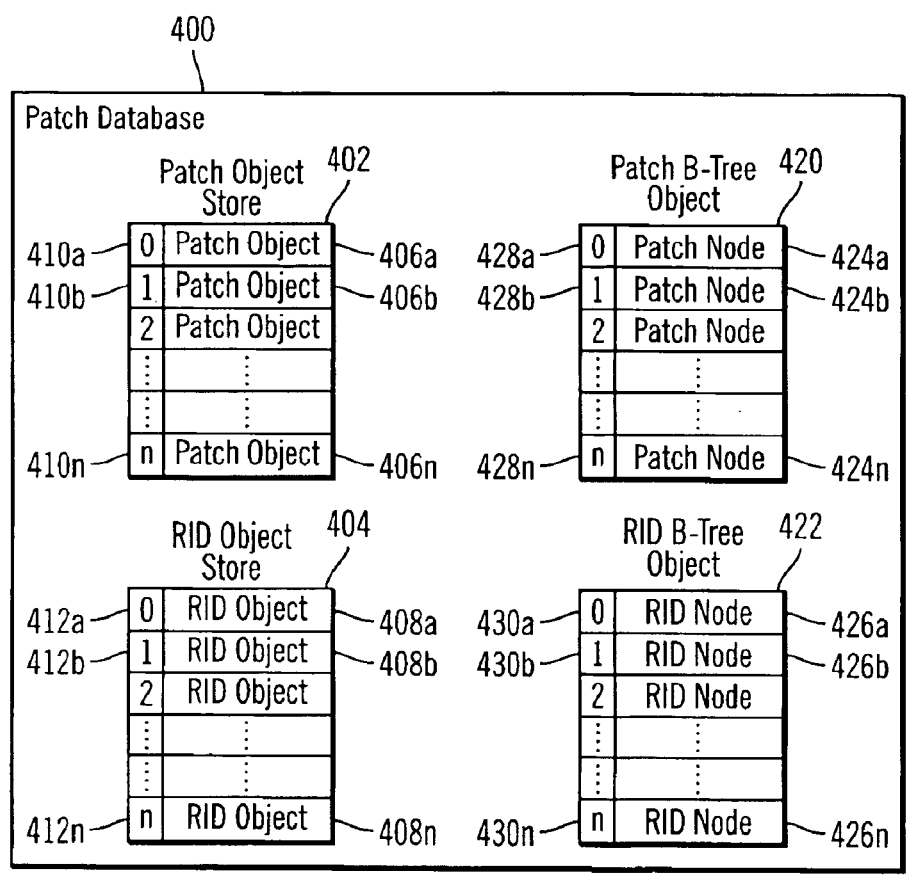
FIG. 10 illustrates an object oriented database computing environment including certain implementations of the invention.

With the network implementation described with respect to FIG. 10, the network administrator does not have to interrogate or query the different hosts 302a, b . . . n, and may instead determine patches to apply using only the host objects 316a, b . . . n. In this way, the described implementations provide a tool to facilitate the application of patches to multiple hosts 302a, b . . . n managed by a common network administrator.

Using a Database to Determine Patches to Install

In additional implementations, the patch-realization map 28 may be implemented as a patch database 400 illustrated in FIG. 10. The patch database 400 is processed by the host update program 10 to determine the patch identifiers (patch IDs) 29a, b . . . n of patches 22a, b . . . n to include in a user patch list 18 (FIG. 1) to present to the user to allow selection of patches to apply to the host 2.

The patch database 400 comprises an object oriented database including two object stores, a patch object store 402 and a realization identifier (RH) object store 404. Each object store 402 and 404 includes a plurality of objects 406a, b . . . n and 408a, b . . . . n, respectively, where each patch and RID object comprises an object oriented object that is an instance of a class. Each object 406a, b . . . n and 408a, b . . . n in the object stores 402 and 404, respectively, has an associated index value 410a, b . . . n and 412a, b . . . n, respectively, that is used to access the object 406a, b . . . n and 408a, b . . . n in the store. In certain implementations, the object stores 402 and 404 may each be implemented as a Java vector, using the interfaces of the Java vector utility class. In such case, the patch 406a, b . . . n and RID 408a, b . . . n objects in the patch and RID Java vectors are accessed using the index value 410a, b . . . n and 412a, b . . . n of the object. In Java vector implementations, the index value 410a, b . . . n and 412a, b . . . n provides a unique identifier or handle for the object 406a, b . . . n and 408a, b . . . n in the object stores 402 and 404. A Java vector comprises an array that may automatically increase or decrease in size as necessary without requiring additional code or configuration.

The patch database 400 further includes a B-Tree object 420 and 422 for each object store 402 and 404 that implements a B-Tree searchable index for the patch 402 and RID 404 objects. Each node 424a, b . . . n and 426a, b . . . n of the B-Tree objects 420 and 422, respectively, represents one of the objects 406a, b . . . n and 408a, b . . . n in the respective object store 402 and 404. Each B-Tree node 424a, b . . . n and 426a, b . . . n has a corresponding index value 428a, b . . . n and 430a, b . . . n that comprises a unique identifier of the respective node 424a, b . . . n and 426a, b . . . n in the B-Tree objects 420 and 422 that is used to access the respective node 424a, b . . . n and 426a, b . . . n in the respective B-Tree object 420 and 422. The B-Tree objects 420 and 422 may be implemented as a Java vector using the Java vector utility class. Further details on the implementation of the object oriented database structure is described in the co-pending and commonly assigned patent application entitled "Method, System, Program, and Computer Readable Medium for Indexing Object Oriented Objects In an Object Oriented Database", having attorney docket no. P5752, and filed on Apr. 27, 2001, which patent application is incorporated herein by reference in its entirety.

In certain implementations, the host update program 10 would include code to access objects in the patch database 400. In implementations where the database objects 402, 404, 420, and 422 comprise Java vectors, the host update program 10 would utilize interfaces in the Java vector utility clasg to manipulate the objects in the vectors.

FIG. 11 illustrates an implementation of the data structure of the patch objects 406a, b . . . n as including:

Patch ID 450: provides the unique identifier 29a, b . . . n (FIG. 1) of the patch.

RID) List 452: provides a list of realization identifiers (RIDs), identifying a realization, such as the realizations 30a, b . . . n discussed above, that identify specific host 2 states relevant to whether patch code 24 for the patch 22a, b . . . n may be installed on the host 2. For instance, if the patch 22a, b . . . n comprises a fix, the realization may indicate a fault state corrected by the fix.

Patch Expressions 454: Comprises one or more patch expression, such as the patch expressions 26 discussed with respect to FIG. 1, that are used to evaluate conditions in the host object 16 to determine whether the patch code 24 may be applied.

Patch Description 456: provides information on the patch, such as what is accomplished by applying the patch code 24, any base patches that must be installed before the patch can be installed, and any patches that are recommended, but not required, to be installed with the patch.

FIG. 12 illustrates an implementation of the data structure of the RID objects 408a, b . . . n as including:

RID 470: comprises a unique identifier or RID of a realization 32a, b . . . n.

Patch List 472: a list of all patches 22a, b . . . n whose installation requires consideration of the realization 32a, b . . . n identified by the RID.

FIG. 13 illustrates an implementation of a data structure of the nodes 424a, b . . . n and 426a, b . . . n in the patch 420 and RID 422 B-Tree objects. Each node 424a, b . . . n and 426a, b . . . n in the B-tree objects 420 and 422 represents a node in a balanced tree data structure known in the art. Each node 424a, b . . . n and 426a, b . . . n includes a field 490 having the index value 410a, b . . . n and 412a, b . . . n of the respective patch 406a, b . . . n and 408a, b . . . n object in the respective object store 402 and 404 that the node 424a, b . . . n and 426a, b . . . n represents in the respective B-Tree object 420 and 422. A left child node index 492 provides the index value 428a, b . . . n and 430a, b . . . n of the left child node in the respective B-Tree object 420 and 422 used to access the left child node and a right child node index 492 comprises the index value 428a, b . . . n and 430a, b . . . n used to access the right child node 424a, b . . . n and 426a, b . . . n in the respective B-tree object 420 and 44. In this way, the nodes 424a, b . . . n and 426a, b . . . n in the B-tree object 420 and 422 represent the objects 406a, b . . . n and 408a, b . . . n in the respective object store 402 and 404 in a balanced tree or B-Tree data structure that is organized according to one or more key values in the objects 406a, b . . . n and 408a, b . . . n. The key value may comprise the unique patch 450 and RID 470 IDs.

A root node index value comprises the index value of the root node of the B-Tree implemented in the B-tree objects 420 and 422. To traverse the B-Tree implemented in the B-Tree objects 420 and 422, at each node 424a, b . . . n and 426a, b . . . n, the branch taken, e.g., right or left branch, depends upon the outcome of a comparison of the query key, i.e., the key being searched on, and the key for the object 406a, b . . . n and 408a, b . . . n represented by the node. If the query key is less than the key in the object 406a, b . . . n and 408a, b . . . n indexed by field 490 in the node, then the left branch is taken, if greater, the right branch is taken. Further details of how the B-Tree objects may be searched and traversed are described in the co-pending and commonly assigned patent application entitled "Method, System, Program, and Computer Readable Medium for Indexing Object Oriented Objects In an Object Oriented Database", having attorney docket no. P5752, and which was incorporated by reference above.

In the described implementations, the objects 406a, b . . . n and 408a, b . . . n in the object stores 402 and 404 include a field that has the key value for that object. The host update program 10 may issue a Java GET method identifying an object and field to obtain the value for a particular field in the object 406a, b . . . n and 408a, b . . . n.

Figure 14:
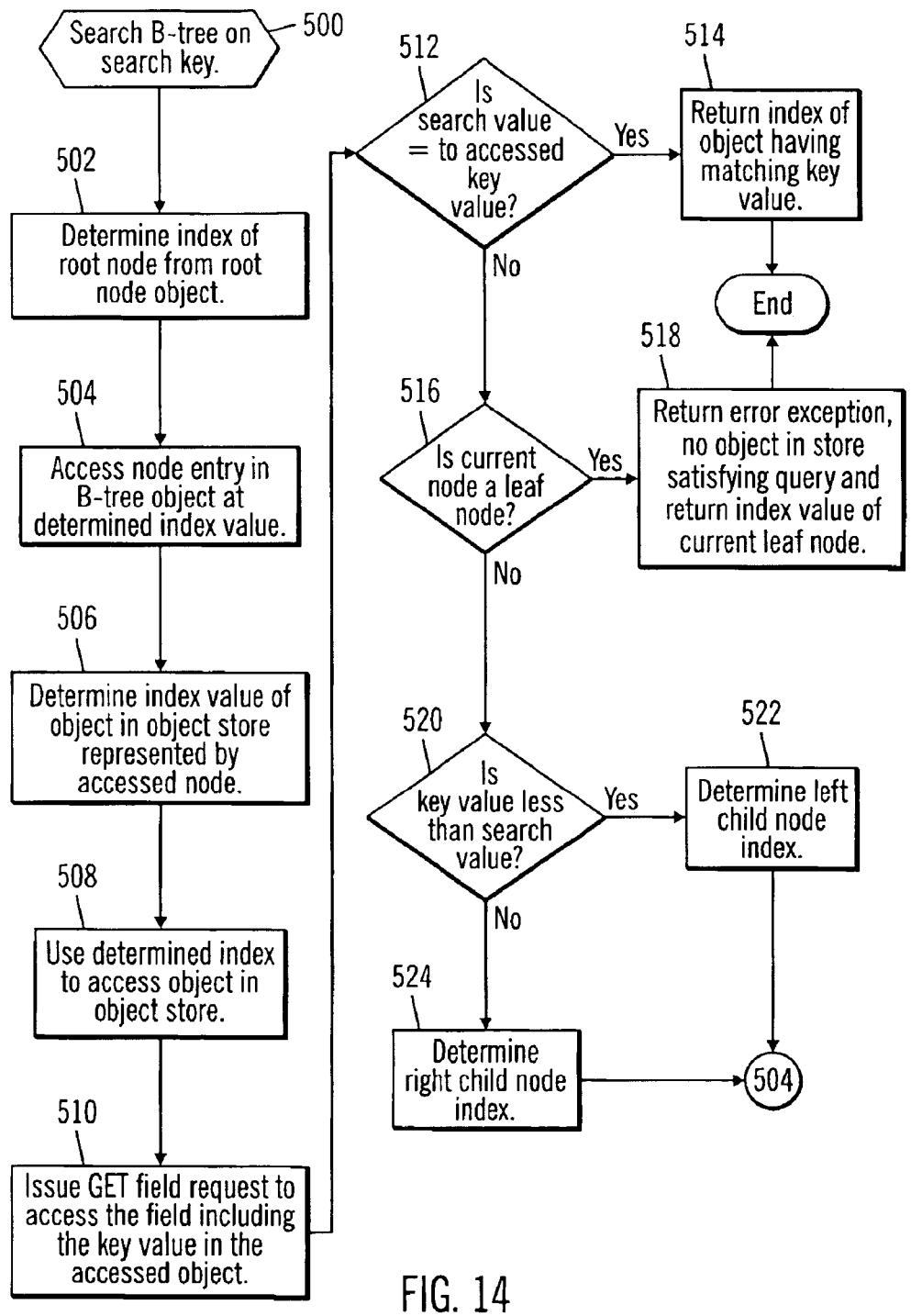
FIG. 14 illustrates logic to search an index for an object in accordance with certain described implementations of the invention.

FIG. 14 illustrates logic implemented in the host update program 10 to execute a search operation to find a node 424a, b . . . n or 426a, b . . . n in the B-tree object 420 or 422 representing an object 406a, b . . . n, 408a, b . . . n in the object store 402 or 404 having a key value matching a query value. Control begins at block 500 upon receiving the search value and a call to the find operation. In response, the host update program 10 determines (at block 502) the root node index of the B-Tree object 420 or 422 being searched. The host update program 10 then accesses (at block 504) the node entry 424a, b . . . n or 426a, b . . . n in the respective B-Tree object 420 or 424 at the determined node index 428a, b . . . n and 430a, b . . . n. For instance, in Java vector implementations, the host update program 10 can use the elementAt(int) method of the Java utility vector class to access the node 424a, b . . . n or 426a, b . . . n at the index number 428a, b . . . n or 430a, b . . . n passed as the parameter to the elementAt( ) function. The host update program 10 then determines (at block 506) the index value 410a, b . . . n or 412a, b . . . n of the object 406a, b . . . n or 408a, b . . . n represented by the accessed node entry 424a, b . . . n or 426a, b . . . n from the object index value field 490 (FIG. 13) in the accessed node entry 424a, b . . . n or 426a, b . . . n.

The object index 428a, b . . . n or 430a, b . . . n in the object index value field 490 is then used (at block 508) to access the object 406a, b . . . n or 408a, b . . . n represented by the accessed node 424a, b . . . n or 426a, b . . . n. In Java vector implementations, the elementat( ) function may be used to access the object 406a, b . . . n or 408a, b . . . n in the object store 402 or 404 using the determined index value 410a, b . . . n or 412a, b . . . n. In Java implementations, a Java GET field request is issued (at block 510) to access the key value in the accessed object 406a, b . . . n or 408a, b . . . n.

If (at block 512) the search value is equal to the returned key value in the accessed object 406a, b . . . n or 408a, b . . . n, then the host update program 10 returns (at block 514) the index value 410a, b . . . n or 412a, b . . . n of the object 406a, b . . . n or 408a, b . . . n having the matching key value. Otherwise, if (at block 512) the accessed key value does not match the search value, then the host update program 10 determines (at block 516) whether the node 424a, b . . . n or 426a, b . . . n accessed at block 504 is a leaf node. A leaf node may be indicated by setting the left 492 and right 494 (FIG. 13) node index values to NULL. If the current accessed node 424a, b . . . n or 426a, b . . . n is a leaf node, then the host update program 10 returns (at block 518) an error exception indicating that no object 406a, b . . . n or 408a, b . . . n includes a key value matching the query value. If the current node is not a leaf node, i.e., there are child nodes, and the determined key value is less (at block 520) than the search value, then the host update program 10 determines (at block 522) the left child node index value 428a, b . . . n or 430a, b . . . n in the field 492 of the accessed node 424a, b . . . n or 426a, b . . . n. Otherwise, if the key value is greater (at block 520) thah the query value, then the right child node index value 428a, b . . . n or 430a, b . . . n is determined from field 494 in the accessed node 424a, b . . . n or 426a, b . . . n. From block 522 or 524, control proceeds back to block 504 to access the node 424a, b . . . n or 426a, b . . . n at the determined index value 428a, b . . . n or 430a, b . . . n. Also, if there is only one child node, and the determination at blocks 522 and 524 identifies a NULL value for the left or right child node index value, respectively, then control proceeds to block 518 to return an error.

With the above implementations, a balanced or B-tree data structure may be used to index and search the object store 402 or 404 for an object 406a, b . . . n or 408a, b . . . n having a key value matching a search query without requiring the use of special OODB interfaces. Instead, standard interfaces from the Java vector utility class may be used to access the objects 406a, b . . . n or 408a, b . . . n in the object store 402 or 404 using a B-Tree index of the object store 402 or 404 elements implemented in the B-Tree object 420 or 422. Thus, manipulations of the object oriented database 400 do not require that the objects implement interfaces of a special database class or be extended to accommodate special OODB database classes. In the above described implementations, all that is needed to determine the key value of the object is knowledge of the object field that contains the key value. Additionally, the B-Tree object 420 or 422 may implement a multi-key B-tree index, in which case the database server 400 would have to use Java GET methods to access multiple key values from the objects.

Figure 15:
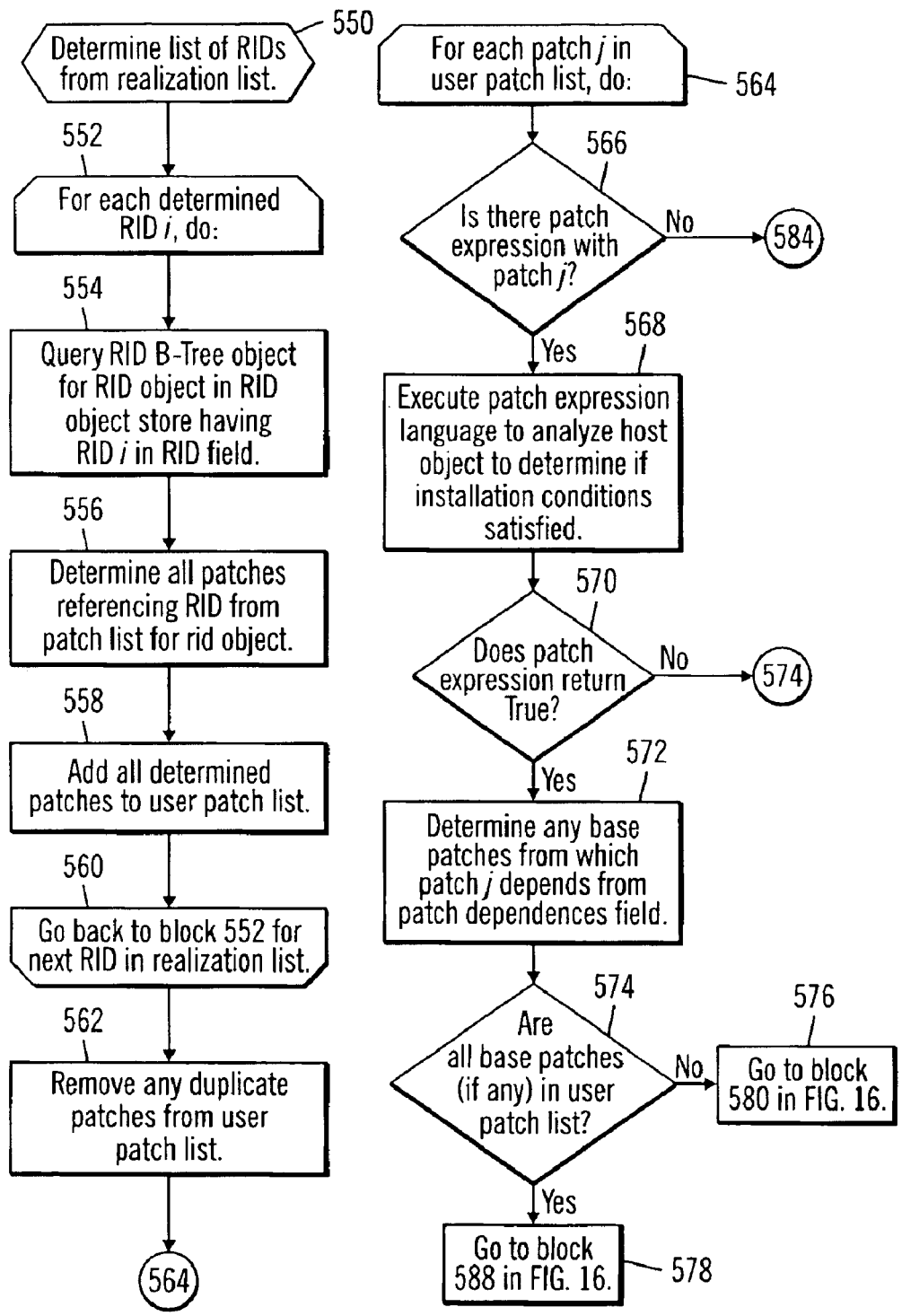
FIGS. 15 and 16 illustrate logic to determine and present patches that can be installed on a system in accordance with certain described implementations of the invention.
Figure 16:
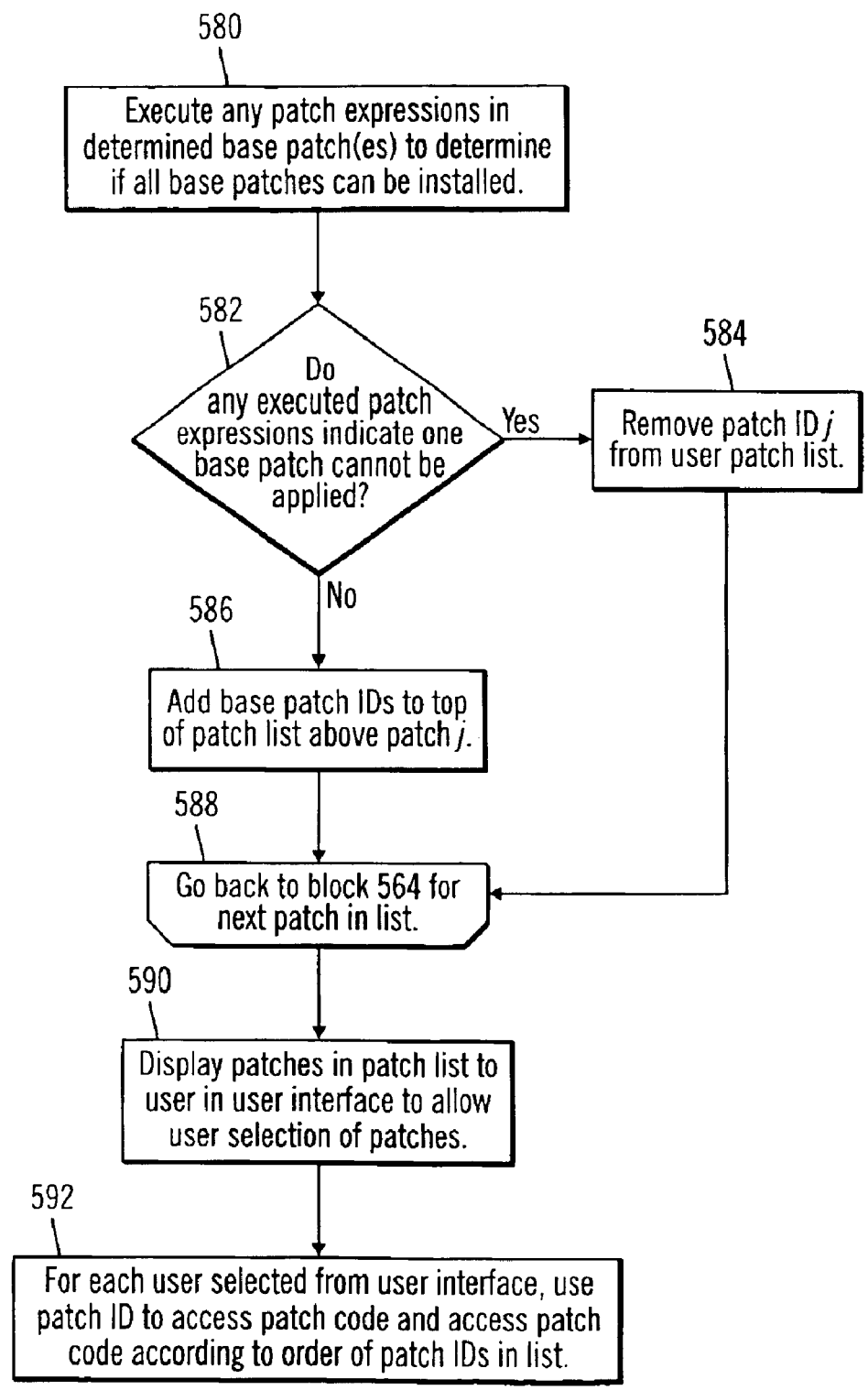

As discussed above, the host object 16 includes a realization list 50 of realizations 52a, b, c (FIG. 2) added thereto by detector programs 36 in realization detectors 30a, b . . . n or through a servlet adding realizations to the list 52 in response to user selection of configuration options that are directly associated with a realization. FIGS. 15 and 16 illustrate logic implemented in the host update program 10 to use the patch database 400 to provide a list of patches that may be applied to the host 2 based on the realizations 52a, b . . . n added to the realization list 52. Control begins at block 550 with the host update program 10 determining a list of realization identifiers (RIDs) from the realizations 52a, b . . . n in the realization list 52 (FIG. 2). The RID may comprise the realization name 70 and version number 72 (FIG. 4). For each determined RID i verified as true, as indicated in the verified flag 74 (FIG. 4), the host update program 10 performs a loop at blocks 552 to 560 to generate a list of patches 22a, b . . . n associated with the realizations verified as true in the host object 16. At block 554, the host update program 10 queries the RID B-Tree object 422 to determine the RID object 408a, b . . . n for RID i, by traversing the B-Tree using the logic of FIG. 4 to access the RID node 426a, b . . . n representing the RID object 408a, b . . . n for the RID i. A determination is made (at block 556) of all the patches listed in the patch list 572 for the determined RID object 408a, b . . . n, which are added (at block 558) to a user patch list, such as the user patch list 18 shown in FIG. 1. At block 560, control returns to block 552 to consider the next realization 52a, b . . . n in the realization list 50. After determining all patches that may be applicable to the host 2, i.e., patches related to the listed realizations 52a, b . . . n, the host update program 10 removes (at block 562) any duplicate patches, identified by their patch ID, from the patch list 18.

From block 564 to block 588 in FIG. 16, the host update program 10 performs a loop to determine those patch IDs in the user patch list 18 that can be installed on the host 2 based on the patch expressions 26 provided for each patch 22a, b . . . n. The host update program 10 can access the patch objects 406a, b . . . n for a patch ID by searching the patch B-Tree object 420 using the patch ID as the key field and the logic of FIG. 14. If (at block 566) there is one or more patch expressions 454 (FIG. 11) provided with the patch object 406a, b . . . n having the patch ID j, then the host update program 10 executes the patch expression(s) 454 to analyze the configuration information 40 and/or realization 50 list in the host object 16 (FIG. 2). From block 570 (if the patch expressions return true) or block 566 (if there are no patch expressions), the host update program 10 determines (at block 572) whether the patch expressions 454 specify any patch dependencies, i.e., the patch IDs of base patches that must be installed for the patch ID j to be installed.

If (at block 574) all the determined base patches are in the user patch list 18, then the host update program 10 executes (at block 580 in FIG. 17) any patch expressions 454, including dependency expressions for the base patch, to determine if all determined base patches can be installed. The base patch expressions would be accessed using the base patch ID, provided with the patch expressions 454, and the patch B-Tree object 420 to locate the patch object 406a, b . . . n for the base patch ID. With respect to FIG. 17, if (at block 582) any executed base patch expression indicates that one base patch cannot be applied to the host 2, then the host update program 10 removes the patch ID j from the user patch list 18. If (at block 582) the executed base patch expressions 454 indicate that all the base patches can be applied, then the host update program 10 adds the base patch IDs to the top of the user patch list 18 above the patch ID j, so that the base patches are installed before the dependent patch j. Control then proceeds (at block 588) back to block 564 in FIG. 16 to process the next patch ID in the user patch list 18.

After all the patch IDs in the patch list 18 are processed, from block 588, the resulting user patch list 18 includes all those patch IDs that may be installed on the host 2. The host update program 18 then displays (at block 590) in a user interface a selectable list at the host 2, or a network administrator system (FIG. 9), displaying information on the remaining patch IDs, obtained from the description field 456 in the patch objects 406a, b . . . n. The displayed descriptive information may indicate the base patches the user must also select to apply the patch. Alternatively, the host update program 10 may automatically display base patches as selected in response to the user selecting patches dependent from the base patches, thereby requiring that the base patches be selected and installed with the dependent patch.

For each user selected patch selected from the user interface, the host update program 10 submits (at block 592) a request to the server update program 20 for the patch code 24 for the patch IDs of the user selected patches. The server update program 20 would then package the patch code 24 for the requested patches in a single file, that when unpacked by the host update program 10 installs the patch code 24 for the patches in the order of the patch IDs in the user patch list 18 to ensure that base patches are installed before any dependent patches.

The described database implementations thus provide a technique to package all the information from the patch-realization map 28 needed to determine those patches 22a, b . . . n available at the update server 4 that may be installed at the host 2. Further, packaging information on the patches and realizations in database objects that may be searched using a B-Tree index provides the added advantage that information on patches may be quickly accessed and located using B-Tree index search techniques that optimize searching operations. This allows fast access of patch information in the event that there are numerous patches to consider for installation on the host 2.

Still further, by providing all the information needed to determine relevant patches to apply in the patch database 400 and the host object 16, the host update program 10 is able to determine those patches that may be installed without ever having to access any files from the host 2 system. Instead, all information about the host 2 may be determined from the host object 16, which is generated from the base data detector 12 that provides limited access to the host 2 for gathering data. This architecture ensures secure installations from patches generated by different software vendors because the patches the vendors provide, and any realization detectors and other code therewith, cannot directly access the host 2 as part of determining which patches to apply. This architecture further allows multiple vendors to supply realization detectors without fear of an error leading to an insecure action.

Additional Implementation Details

The described implementations may comprise a method, apparatus, program or article of manufacture using standard programming and/or engineering techniques to produce software, firmware, hardware, or any combination thereof The programs defining the functions of the described implementations can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative implementations of the present invention.

In the described implementations, the host 2 and update server 4 comprised separate computer systems. In alternative implementations, the host and update server may comprise program entities implemented on the same computer platform.

In certain implementations, the update programs, realization detectors, and realization routines are implemented in an object oriented programming language, such as Java, C++, etc. Alternatively, the programs and code described herein may be implemented in a non-object oriented programming language.

The host 2 and update server 4 may use any communication or messaging protocol known in the art to communicate.

In the described implementations, one host object 16 maintained all the information on available hardware and software resources 50 and the realization list 52 (FIG. 4). Alternatively, such information may be distributed across multiple data objects maintained for the host 2.

In the described implementations, realizations 32a, b . . . n were added to the host realization list 50 in response to the detector program 36 verifying a state for the host 2 based on configuration information 40 in the host object 16. In alternative implementations, the host update program 10 may generate a user interface display in which the user selects particular configuration options. A Java Servlet, or other program, may maintain an association of the configuration options in the user interface and realization. Upon receiving user selection of configuration options, the Servlet would then add the associated realizations to the host realization list 50 in the host object 16. In this way, realizations are added to the host object 16 through a user interface.

In the described implementations, the host update program executed the realization detectors and determined patches to apply to the host computer locally. Alternatively, the host object 16 defining the host system 2 may be generated at another computer remotely where the realization detectors execute to determine remotely patches that can be applied to the host system 2. In such implementations, the host objects may be generated using the interactive detector 14 where a user at the remote system enters information on the hardware and software configuration to generate the host object 16.

The described implementations were used to determine patches of code that may be applied to already installed software or firmware components. Additionally, the above technique for determining the suitability of patches to apply may be used to determine the suitability of installing an entirely new program on the system or installing additional documentation. Accordingly, the term "patch" as used herein may apply to updating the host 2 with any program or data, such as updates, upgrades, fixes, new installations, documentation, etc.

Host objects 16 may be maintained and used for numerous patch installations or regenerated each time the host update program 10 is provided a group of patches to install.

In the described implementations, the detector programs 36 included in the realization detectors 26a, b . . . n are not allowed to write to any other parts of the host 2 outside of writing verification information to the host object 16. In alternative implementations, the realization detectors 26a, b . . . n may be provided access to other parts of the host 2. In the discussed implementations, the Java object oriented programming language was used to implement the object store and B-Tree object. However, the objects and database server may utilize object oriented programming languages other than Java, e.g., C, C++, Smalltalk, Fortran, etc. Still further, the objects and data server may be implemented with a non-Java object oriented programming language. Moreover, in alternative implementations, the object store and B-Tree object may be implemented in data structures other than a Java vector.

In discussed implementations, the objects in the object stores comprised an object implemented using an object oriented computer language. In alternative implementations, the objects in the object store 10a, b . . . n may be in different formats, such as an Extensible Markup Language (XML) object, HyperText Transfer Protocol, or any other file format.

In the discussed implementations, the searchable index on the object store was implemented as a B-Tree. Alternative structures may be utilized to implement the searchable index other than the B-Tree structure, such as B+ Trees, ternary trees, etc.

The preferred logic of FIGS. 5–8 and 14–16 describe specific operations occurring in a particular order. In alternative embodiments, certain of the logic operations may be performed in a different order, modified or removed and still implement preferred embodiments of the present invention. Moreover, steps may be added to the above described logic and still conform to the preferred embodiments. Further, operations described herein may occur sequentially or certain operations may be processed in parallel.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for determining patches to apply to a computer system, wherein the patches includes content to add to the computer, comprising:

providing a realization list of realization identifiers corresponding to realizations associated with the computer, wherein each realization defines a state of the computer;

providing a realization database of realization objects, wherein each realization object is uniquely identified by a realization identifier of one realization and includes a patch list indicating those patches whose installation relates to the computer state defined by the realization;

accessing from the realization database the patch lists of those realization objects whose realization identifiers match the realizations identifiers on the realization list;

determining all the patches on the accessed patch lists; and determining from the determined patches on the accessed patch lists those patches that are capable of being installed on the computer.

2. The method of claim 1, wherein the patch content to add to the computer is capable of comprising one of: a new program; an upgrade to an installed program; a fix to an installed program; and documentation.

3. The method of claim 1, further comprising:

providing a searchable realization index in the realization database; and for each realization identifier on the realization list, using the realization identifier to access an entry in the realization index, wherein each entry in the realization index identifies one corresponding realization object in the realization database, and wherein the entry is used to access the corresponding realization object in the realization database.

4. The method of claim 3, wherein the realization index implements a binary tree index.

5. The method of claim 1, further comprising:

presenting information on an output device of those determined patches capable of being installed on the computer; and receiving user selection of one or more patches to add to the computer indicated in the presented information.

6. The method of claim 5, further comprising:

requesting from a server the patch content for the user selected patches;

receiving the patch content for the selected patches from the server; and applying the patch content to the computer.

7. The method of claim 1, further comprising:
providing a searchable patch database including patch objects corresponding to one patch of content and including a patch expression set comprised of one or more patch expressions;
accessing from the patch database those patch objects for the determined patches on the accessed patch lists; and
executing the patch expression sets in the accessed patch objects to determine patches identified by the accessed patch objects capable of being installed on the computer.

8. The method of claim 7, further comprising:
generating a computer object including configuration information on components in the computer, wherein the executed patch expression sets are capable of processing configuration information and the realization list to determine whether the patch is capable of being installed on the computer.

9. The method of claim 7, further comprising:
providing a searchable patch index into the patch database, wherein each entry in the patch index identifies one corresponding patch object in the patch database representing one patch, wherein the patch index entry is used to access the corresponding patch object in the patch database.

10. The method of claim 9, wherein each patch is associated with one patch identifier, wherein the entries in the patch index include the patch identifier of the patch represented by the corresponding patch object, further comprising:
searching the patch index for those entries including patch identifiers matching the patch identifiers of the determined patches from the accessed patch lists.

11. A method for determining patches to apply to a computer system, wherein the patches include content to add to the computer, comprising:
generating a computer object including configuration information on components in the computer and a realization list of realization identifiers corresponding to realizations associated with the computer, wherein each realization defines a state of the computer;
downloading a realization database of realization objects from a patch server, wherein each realization object is uniquely identified by a realization identifier of one realization and includes a patch list indicating those patches whose installation relates to the computer state defined by the realization;
accessing from the realization database the patch lists of those realization objects whose realization identifiers match the realizations identifiers on the realization list;
determining all the patches on the accessed patch lists; and
determining from the determined patches on the accessed patch lists those patches that are capable of being installed on the computer.

12. The method of claim 11, wherein the steps of downloading the realization database, accessing the patch lists, determining all the patches on the accessed patch lists, and determining those patches capable of being installed on the computer are performed in the computer.

13. The method of claim 11, wherein a network administrator system includes a plurality of computer objects associated with a plurality of computers on a network, wherein each computer object includes the configuration information and the realization list for one computer on the network, and wherein the steps of downloading the realization database, accessing the patch lists, determining all the patches on the accessed patch lists, and determining those patches capable of being installed on the computer are performed on the network administrator system.

14. The method of claim 11, wherein the steps of accessing from the realization database the patch lists of those realization objects whose realization identifiers match the realizations identifiers on the realization list are performed for the realization lists in the computer objects for the computers on the network, wherein the patches are determined from the patch lists for the computer objects, and wherein the determined patches on the accessed patch lists are those patches that are capable of being installed on the computers in the network.

15. The method of claim 14, further comprising:
generating a list of all patches determined to be compatible with the installed components of the computers on the network; and
rendering the list of patches on an output device to enable a user of the network administrator system to select the code of one or more of the patches on the list to install on one or more of the computers in the network.

16. A system for determining patches to apply to a computer, wherein the patches include content to add to the computer, comprising:
means for providing a realization list of realization identifiers corresponding to realizations associated with the computer, wherein each realization defines a state of the computer;
means for providing a realization database of realization objects, wherein each realization object is uniquely identified by a realization identifier of one realization and includes a patch list indicating those patches whose installation relates to the computer state defined by the realization;
means for accessing from the realization database the patch lists of those realization objects whose realization identifiers match the realizations identifiers on the realization list;
means for determining all the patches on the accessed patch lists; and
means for determining from the determined patches on the accessed patch lists those patches that are capable of being installed on the computer.

17. The system of claim 16, wherein the patch content to add to the computer is capable of comprising one of: a new program; an upgrade to an installed program; a fix to an installed program; and documentation.

18. The system of claim 16, further comprising:
means for providing a searchable realization index in the realization database; and
means for using the realization identifier to access an entry in the realization index for each realization identifier on the realization list, wherein each entry in the realization index identifies one corresponding realization object in the realization database, and wherein the entry is used to access the corresponding realization object in the realization database.

19. The system of claim 18, wherein the realization index implements a binary tree index.

20. The system of claim 16, further comprising:
an output device;
means for presenting information on then output device of those determined patches capable of being installed on the computer; and means for receiving user selection of one or more patches to add to the computer indicated in the presented information.

21. The system of claim 20, wherein the system is in communication with a server, further comprising:
means for requesting from the server the patch content for the user selected patches;
means for receiving the patch content for the selected patches from the server; and
means for applying the patch content to the computer.

22. The system of claim 16, further comprising:
means for providing a searchable patch database including patch objects corresponding to one patch of content and including a patch expression set comprised of one or more patch expressions;
means for accessing from the patch database those patch objects for the determined patches on the accessed patch lists; and
means for executing the patch expression sets in the accessed patch objects to determine patches identified by the accessed patch objects capable of being installed on the computer.

23. The system of claim 22, further comprising:
means for generating a computer object including configuration information on components in the computer, wherein the executed patch expression sets are capable of processing configuration information and the realization list to determine whether the patch is capable of being installed on the computer.

24. The system of claim 22, further comprising:
means for providing a searchable patch index into the patch database, wherein each entry in the patch index identifies one corresponding patch object in the patch database representing one patch, wherein the patch index entry is used to access the corresponding patch object in the patch database.

25. The system of claim 24, wherein each patch is associated with one patch identifier, wherein the entries in the patch index include the patch identifier of the patch represented by the corresponding patch object, further comprising:
means for searching the patch index for those entries including patch identifiers matching the patch identifiers of the determined patches from the accessed patch lists.

26. A system for determining patches to apply on a computer, wherein the patches include content to add to the computer, comprising:
means for generating a computer object including configuration information on components in the computer and a realization list of realization identifiers corresponding to realizations associated with the computer, wherein each realization defines a state of the computer;
means for downloading a realization database of realization objects from a patch server, wherein each realization object is uniquely identified by a realization identifier of one realization and includes a patch list indicating those patches whose installation relates to the computer state defined by the realization;
means for accessing from the realization database the patch lists of those realization objects whose realization identifiers match the realizations identifiers on the realization list;
means for determining all the patches on the accessed patch lists; and
means for determining from the determined patches on the accessed patch lists those patches that are capable of being installed on the computer.

27. The system of claim 26, wherein the means for downloading the realization database, accessing the patch lists, determining all the patches on the accessed patch lists, and determining those patches capable of being installed on the computer are performed in the computer.

28. The system of claim 26, further comprising:
a network administrator system including a plurality of computer objects associated with a plurality of computers on a network, wherein each computer object includes the configuration information and the realization list for one computer on the network, and wherein the means for downloading the realization database, accessing the patch lists, determining all the patches on the accessed patch lists, and determining those patches capable of being installed on the computer are performed on the network administrator system.

29. The system of claim 26, wherein the means for accessing from the realization database the patch lists of those realization objects whose realization identifiers match the realizations identifiers on the realization list are performed for the realization lists in the computer objects for the computers on the network, wherein
the patches are determined from the patch lists for the computer objects, and wherein the determined patches on the accessed patch lists are those patches that are capable of being installed on the computers in the network.

30. The system of claim 29, further comprising:
an output device;
means for generating a list of all patches determined to be compatible with the installed components of the computers on the network; and
means for rendering the list of patches on the output device to enable a user of the network administrator system to select the code of one or more of the patches on the list to install on one or more of the computers in the network.

31. An article of manufacture for determining patches to apply to a computer system, wherein the patches includes content to add to the computer, by:
providing a realization list of realization identifiers corresponding to realizations associated with the computer, wherein each realization defines a state of the computer;
providing a realization database of realization objects, wherein each realization object is uniquely identified by a realization identifier of one realization and includes a patch list indicating those patches whose installation relates to the computer state defined by the realization;
accessing from the realization database the patch lists of those realization objects whose realization identifiers match the realizations identifiers on the realization list;
determining all the patches on the accessed patch lists; and
determining from the determined patches on the accessed patch lists those patches that are capable of being installed on the computer.

32. The article of manufacture of claim 31, wherein the patch content to add to the computer is capable of comprising one of a new program; an upgrade to an installed program; a fix to an installed program; and documentation.

33. The article of manufacture of claim 31, further comprising:

providing a searchable realization index in the realization database; and for each realization identifier on the realization list, using the realization identifier to access an entry in the realization index, wherein each entry in the realization index identifies one corresponding realization object in the realization database, and wherein the entry is used to access the corresponding realization object in the realization database.

34. The article of manufacture of claim 33, wherein the realization index implements a binary tree index.

35. The article of manufacture of claim 31, further comprising:

presenting information on an output device of those determined patches capable of being installed on the computer; and receiving user selection of one or more patches to add to the computer indicated in the presented information.

36. The article of manufacture of claim 35, further comprising:

requesting from a server the patch content for the user selected patches;

receiving the patch content for the selected patches from the server; and applying the patch content to the computer.

37. The article of manufacture of claim 31, further comprising:

providing a searchable patch database including patch objects corresponding to one patch of content and including a patch expression set comprised of one or more patch expressions;

accessing from the patch database those patch objects for the determined patches on the accessed patch lists; and executing the patch expression sets in the accessed patch objects to determine patches identified by the accessed patch objects capable of being installed on the computer.

38. The article of manufacture of claim 37, further comprising:

generating a computer object including configuration information on components in the computer, wherein the executed patch expression sets are capable of processing configuration information and the realization list to determine whether the patch is capable of being installed on the computer.

39. The article of manufacture of claim 37, further comprising:

providing a searchable patch index into the patch database, wherein each entry in the patch index identifies one corresponding patch object in the patch database representing one patch, wherein the patch index entry is used to access the corresponding patch object in the patch database.

40. The article of manufacture of claim 39, wherein each patch is associated with one patch identifier, wherein the entries in the patch index include the patch identifier of the patch represented by the corresponding patch object, further comprising:

searching the patch index for those entries including patch identifiers matching the patch identifiers of the determined patches from the accessed patch lists.

41. An article of manufacture for determining patches to apply to a computer system, wherein the patches include content to add to the computer, comprising:

generating a computer object including configuration information on components in the computer and a realization list of realization identifiers corresponding to realizations associated with the computer, wherein each realization defines a state of the computer;

downloading a realization database of realization objects from a patch server, wherein each realization object is uniquely identified by a realization identifier of one realization and includes a patch list indicating those patches whose installation relates to the computer state defined by the realization;

accessing from the realization database the patch lists of those realization objects whose realization identifiers match the realizations identifiers on the realization list;

determining all the patches on the accessed patch lists; and determining from the determined patches on the accessed patch lists those patches that are capable of being installed on the computer.

42. The article of manufacture of claim 41, wherein the steps of downloading the realization database, accessing the patch lists, determining all the patches on the accessed patch lists, and determining those patches capable of being installed on the computer are performed in the computer.

43. The article of manufacture of claim 41, wherein a network administrator system includes a plurality of computer objects associated with a plurality of computers on a network, wherein each computer object includes the configuration information and the realization list for one computer on the network, and wherein the steps of downloading the realization database, accessing the patch lists, determining all the patches on the accessed patch lists, and determining those patches capable of being installed on the computer are performed on the network administrator system.

44. The article of manufacture of claim 41, wherein the steps of accessing from the realization database the patch lists of those realization objects whose realization identifiers match the realizations identifiers on the realization list are performed for the realization lists in the computer objects for the computers on the network, wherein the patches are determined from the patch lists for the computer objects, and wherein the determined patches on the accessed patch lists are those patches that are capable of being installed on the computers in the network.

45. The article of manufacture of claim 44, further comprising:

generating a list of all patches determined to be compatible with the installed components of the computers on the network; and rendering the list of patches on an output device to enable a user of the network administrator system to select the code of one or more of the patches on the list to install on one or more of the computers in the network.

46. A computer readable medium including data structures used to determining patches to apply to a computer system, wherein the patches includes content to add to the computer, comprising:

a realization list of realization identifiers corresponding to realizations associated with the computer, wherein each realization defines a state of the computer;

a realization database of realization objects, wherein each realization object is uniquely identified by a realization identifier of one realization and includes a patch list indicating those patches whose installation relates to the computer state defined by the realization, wherein the patch lists are accessed from the realization objects in the realization database whose realization identifiers match the realizations identifiers on the realization list, wherein a determination is made of all the patches on the accessed patch lists, and wherein a determination is made from the determined patches on the accessed patch lists of those patches that are capable of being installed on the computer.

47. The computer readable medium of claim 46, further comprising:

a searchable realization index in the realization database, wherein the realization identifier for each realization on the realization list is used to access an entry in the realization index, wherein each entry in the realization index identifies one corresponding realization object in the realization database, and wherein the entry is used to access the corresponding realization object in the realization database.

48. The computer readable medium of claim 47, wherein the realization index implements a binary tree index.

49. The computer readable medium of claim 46, further comprising:

a searchable patch database including patch objects corresponding to one patch of content and including a patch expression set comprised of one or more patch expressions, wherein the patch objects for the determined patches on the accessed patch lists are accessed from the patch database, and wherein the patch expression sets in the accessed patch objects are executed to determine patches identified by the accessed patch objects capable of being installed on the computer.

50. The computer readable medium of claim 49, further comprising:

a computer object including configuration information on components in the computer, wherein the executed patch expression sets are capable of processing configuration information and the realization list to determine whether the patch is capable of being installed on the computer.

51. The computer readable medium of claim 49, further comprising:

a searchable patch index into the patch database, wherein each entry in the patch index identifies one corresponding patch object in the patch database representing one patch, wherein the patch index entry is used to access the corresponding patch object in the patch database.

52. A computer readable medium including data structures used for determining patches to apply to a computer system, wherein the patches include content to add to the computer, comprising:

a computer object including configuration information on components in the computer and a realization list of realization identifiers corresponding to realizations associated with the computer, wherein each realization defines a state of the computer;

a realization database of realization objects from a patch server, wherein each realization object is uniquely identified by a realization identifier of one realization and includes a patch list indicating those patches whose installation relates to the computer state defined by the realization, wherein patch lists are accessed from those realization objects in the realization database whose realization identifiers match the realizations identifiers on the realization list, wherein a determination is made of all the patches on the accessed patch lists, and wherein a determination is made from the determined patches on the accessed patch lists of those patches that are capable of being installed on the computer.

* * * * *